United States Patent
Roe et al.

[11] 3,717,213
[45] Feb. 20, 1973

[54] VEHICLE DRIVE SYSTEM AND CONTROL MEANS THEREFOR

[75] Inventors: Robert A. Roe; Gerald C. Anderson, both of Oconomowoc, Wis.

[73] Assignee: Applied Power Industries, Inc., Milwaukee, Wis.

[22] Filed: July 17, 1970

[21] Appl. No.: 55,729

[52] U.S. Cl. ............................. 180/6.48, 180/66 R
[51] Int. Cl. ............................................. B62d 11/04
[58] Field of Search ....180/6.48, 6.3, 66 R; 60/52 VS

[56] References Cited

UNITED STATES PATENTS

| | | | |
|---|---|---|---|
| 3,224,196 | 12/1965 | Bennett | 180/6.48 X |
| 3,233,691 | 2/1966 | De Biasi | 180/6.48 |

FOREIGN PATENTS OR APPLICATIONS

| | | | |
|---|---|---|---|
| 979,453 | 1/1965 | Great Britain | 180/6.48 |

Primary Examiner—Benjamin Hersh
Assistant Examiner—John A. Pekar
Attorney—John J. Bryne

[57] ABSTRACT

A hydraulic drive system for motor vehicles, particularly track vehicles, of the type having hydraulic motors for each of the tracks and pumps for each of said motors, with each pump being driven by a prime mover. The output of each pump is inversely proportional to the pressure of a fluid control signal fed back from the output line of the pumps through a pressure regulator which regulates the pressure of the control signal. A governor-regulator communicates with the first-mentioned regulators and sets the lower limit of the pressure range of the control signal and thereby sets the upper limit on the speed of the vehicle because of the inverse relationship between the output of the pumps and the pressure of the control signals.

4 Claims, 2 Drawing Figures

VEHICLE DRIVE SYSTEM AND CONTROL MEANS THEREFOR

This invention relates to a hydraulic drive system for a vehicle and more particularly to means for controlling the drive system and limiting the speed of the vehicle.

The system of this invention is particularly adapted for use in endless track vehicles wherein the respective tracks are driven at different relative speeds in steering the vehicle. Generally, the turning of a track vehicle is accomplished by braking one track relative to the other through systems employing a brake pedal for each track. The maintenance expense involved in replacing worn brakes is obviously quite high not to mention the inefficient use of the power means which is working against the brakes in the turning operation.

It is an object of this invention to provide a simple and efficient means for controlling the turning movements of track vehicles.

It is another object of this invention to provide a hydraulic governor for track vehicles or other low-speed vehicles.

It is a further object of this invention to provide a sensitive and accurate, yet durable, hydraulic pressure regulator control system for use in drive systems employing hydraulic motors driven by a pump whose output is inversely proportional to the pressure of a control signal fed back from said pump output through said regulator system. A pump of the type referred to above wherein the output of the pump is inversely proportional to the pressure of a control signal is disclosed in assignee's copending application by Hamish Cattanach, Ser. No. 738,050, filed June 18, 1968, entitled: Variable Pressure Sensitive Pump, now abandoned, which is a continuation-in-part of Ser. No. 660,505, filed Aug. 14, 1967, entitled: Variable Pressure Sensitive Pump, now abandoned.

The pump is an axial piston pump having by-pass valves in the cylinders thereof, which valves are normally in the closed position. When in the closed position, the output of the pump is at maximum for a given rotary speed of the pump. A hydraulic pressure source, preferably a feedback of a portion of the pump output, is used to control the open period of the by-pass valves in each cylinder during a portion of the piston stroke, bleeding off some of the fluid in the cylinder to tank thereby reducing the output of the individual cylinders and the pump as a whole. The pressure of the feed-back signal determines the duration of the open period of the by-pass valve. The duration of the open period varies directly proportaionally with a change in pressure.

The pressure regulators of this invention can be hydraulically adjusted to maintain the pressure level of the control signal at a selected minimum level thereby limiting the maximum output of the pumps and thereby the speed of the hydraulic motors because of the inverse relationship of pump output and control signal pressure.

More specifically, this invention comprises a drive system for a vehicle having right and left ground-engaging means, comprising, first and second hydraulic motors driving the ground-engaging means respectively, a pump for each of said motors of the type having a variable output which is inversely proportional to a control signal fed to said pumps. First and second pressure regulator means to regulate the pressure of the control signal to said first and second pumps respectively over a range of pressures. Manual actuators are employed for said first and second regulators. A third regulator communicates with each of the first and second regulators for selectively setting the lower limit of said pressure range regulated by said first and second regulators irrespective of the manual actuators. The first and second regulators are interposed between the output and control signal input of each pump respectively and comprise spring-biased check valves which normally close off communication to the control signal input because the output pressure which acts on the valve is greater than the pre-set biasing force. Upon depressing a manual actuator the biasing force is increased and the valve will open transmitting a portion of the output pressure to the pump thereby increasing the pressure of the control signal, decreasing the output of the pump and slowing down the motor. For a given biasing pressure, the valve will modulate to maintain the proper control signal pressure. The third regulator, which is identical to the first and second regulator also communicates with the output of each pump. It also has an actuator which increases the biasing force on its valve. When the actuator of the third regulator is set at a certain position, a certain portion of the output of the pump will be transmitted to the first and second regulator to augment the biasing force in each of said regulators against the output pressures communicated to each of said regulators. In this manner a certain control signal pressure somewhere above zero will be maintained through the regulators thereby limiting the output of the pumps, irrespective of the manual actuators for the first and second regulators.

These and other objects of the invention will become more apparent to those skilled in the art by reference to the following detailed description when viewed in light of the accompanying drawings wherein.

Figure 1:
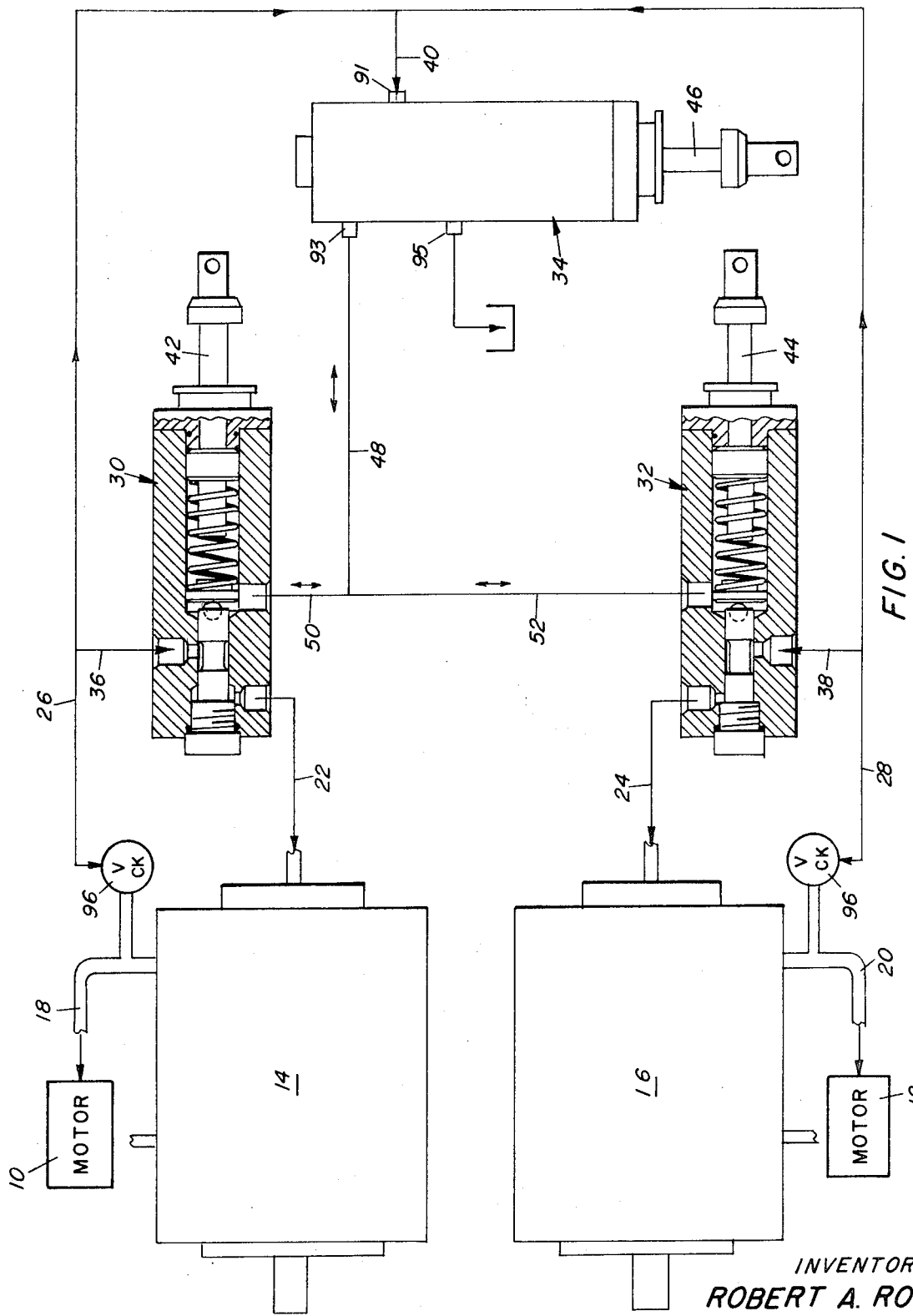
FIG. 1 is a partially diagrammatic showing of the system of this invention.

Referring now to the drawing wherein like numerals indicate like parts, the drive system of this invention is shown diagrammatically in FIG. 1. The system as shown and as will be described, is for a vehicle, particularly a track vehicle, wherein the ground-engaging means of the vehicle are separately driven and controlled. The system is particularly useful in effecting the turning movement of endless track vehicles wherein the speed of one track is varied relative to the other. Hydraulic motors 10 and 12 are employed for right and left wheels or tracks respectively. Any conventional hydraulic motor can be used although rotary motors of the axial piston-cylinder variety are preferred. Communicating with and driving each of the motors 10 and 12 are pumps 14 and 16, respectively, of the type referred to earlier and disclosed in assignee's copending application by Hamish Cattanach, Ser. No. 738,050, filed June 18, 1968, entitled: Variable Pressure Sensitive Pump which is a continuation-in-part of Serial No. 660,505, filed Aug. 14, 1967, entitled: Variable Pressure Sensitive Pump, now abandoned.

The output lines of the pumps 14 and 16 are indicated by the numerals 18 and 20 respectively and the control signal lines to the pumps are indicated by the numerals 22 and 24. As mentioned earlier the output of the pumps and consequently the pressures in lines 18 and 20 vary inversely with the pressure in control signal lines 22 and 24.

The control signal consists of fluid feed-back from the pump output lines 18 and 20 through feed back lines 26 and 28. The feed-back lines communicate the output pressure to a first pressure regulator 30, a second pressure regulator 32 and a third pressure regulator 34 via take-off lines 36, 38 and 40 respectively. The control signal is provided by the outputs of the pumps as regulated by regulators 30 and 32. Each of the regulators are provided with manual actuators 42, 44 and 46, and in the case of a track vehicle or the like the actuators of regulators 30 and 32 are in the form of foot pedals which independently control the speed of the tracks relative to each other as will be further described. The regulators 30 and 32 are preset such that they normally communicate the pump output pressure to tank thereby maintaining the control signal pressure substantially at zero. Upon depression of actuator 42 or 44, a certain portion of the output pressure is transmitted through the regulators 30 or 32 through the control signal lines 22 and 24. With the rise in the pressure of the control signal a corresponding decrease in output occurs in accordance with the particular setting of the actuator. Thereby the speed of motor 10 and consequently its driven track will decrease. If only one actuator is depressed, then one track will be driven at a lower speed than the other thereby effective a turning movement.

When the actuators are in the non-actuated position, the vehicle can travel at full speed. Full speed is determined by the speed of a prime mover not shown, which drives the pumps 14 and 16. It is to be understood that a separate throttle can be used to control the speed of the prime mover.

The third regulator whose operation is substantially identical to that of the first and second regulators communicates with those regulators through lines 48, 50 and 52. When its actuator 46 is depressed, such as by a hand lever, the pressure in lines 42 and 44 rises, and as will be discussed below, has the same effect on the regulators 30 and 32 as does the actuation of the actuators 42 and 44. The result is that a minimum level of pressure is maintained in control signal lines 22 and 24 and thereby a maximum level of output and vehicle speed, somewhere below full throttle, is maintained.

Figure 2:
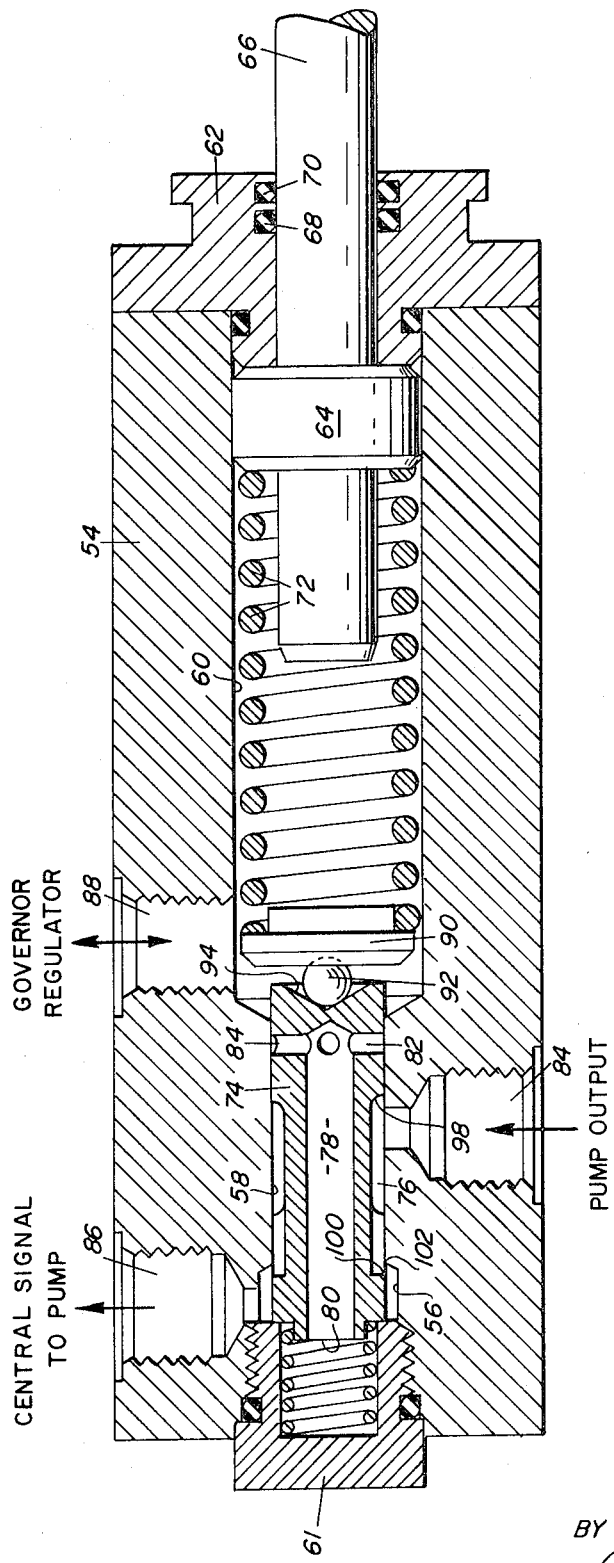
FIG. 2 is an enlargement of one of the pressure regulators shown in FIG. 1.

I will refer now to the particular structure and operation of the regulator and since the regulators are identical, only one, 32, will be described. Referring to FIG. 2, the regulator 32 comprises a housing 54 having centrally disposed bores 56 and 60 communicated by intermediate bore 58. The housing is sealed at each end by plugs 61 and 62. The actuator comprises a reciprocating piston 64 and rod 66, the latter of which extends through plug 62. Seals 68 and 70 prevent leakage about the rod 66, and, as mentioned earlier a foot pedal can be attached to the outer end of the rod 66 when used in track vehicle driving systems, for example. The piston 64 is slidably received in bore 60 and is normally maintained in the position shown by spring 72. Slidably mounted in intermediate bore 58 is cylindrical valve 74 having an annular groove 76 forming a chamber with the walls of the bore 58 and having an axially extending passageway 78 terminating at one end in opening 80 and at the other end in radially outwardly extending ports which in turn terminate in annular groove 84.

The regulator housing has a first port 84 communicating with the output pressure feed back line 38, and terminating in the annular chamber defined by the annular groove 76 in valve 74. A second port 86 communicates the chamber 56 with the control signal line leading to the pump and a third port 88 communicates the bore 60 with the third port of the third regulator or governor 34. In the third regulator 34 the corresponding first port is connected to the output line pressure as are the first ports of the other regulators. The corresponding second port communicates with the third port of each of the other regulators and the corresponding third port of the third regulator communicates with the tank or reservoir which is at zero pressure.

As mentioned above, the valve 74 is normally maintained in the position shown in FIG. 2 by spring 72 and disc 90, the latter of which abuts against the valve 74 via rounded bearing surface and bearing recess 92 and 94 respectively. When the pump is actuated, a portion of the output is taken off by the feedback line 28 through check valve 96. Pressure is transmitted through the first port 84 and into the annular chamber or groove 76. The pressures impinge against the surfaces 98 and if greater than the biasing force of the spring 72, forces the valve to the right against the biasing force of the spring. The spring biasing force in each regulator will normally be set such that the output pressure upon operation of the pump will cause the valve to move to the right whereby the rear end wall 100 of the annular groove 76 overlaps with the rear portion 102 of the bore 56 to close off communication between groove 76 and bore 56. In this position, the second port 86 is communicated with the third port 88 via bore 56, passageway 78 and radial passageways 82. Since all of the regulators are communicated to the same output pressure, absent any actuation of the actuators, each of the regulator valves will be in the same position. Consequently, the second and third ports in the third regulator 34 also will be in communication with each other, thereby the control signal lines will be communicating with tank which is at zero pressure meaning the output of the pumps will be maximum.

The valve 74 is biased to the left-most position by the spring 72, as shown in the drawings, whereby the first port 84 is in communication with the second port 86. However, as mentioned above, when the pressure from the output line reaches a certain value, it overcomes the action of the spring 72 closing off the communication between port 84 and port 86. By depressing the actuator 66, however, the biasing force of the spring 72 can be progressively increased whereupon greater pressure will be required to move the valve to the right position, which in turn means that the first port will be in communication with the second port a greater period of time, thereby increasing the pressure of the control signal and decreasing the output of the pump. It is to be understood that any particular setting of the actuator, the valve will continue to modulate by reciprocating back and forth maintaining the desired pressure in the control signal line.

The purpose of the third actuator is to act as a governor to set a lower limit on the pressure which is transmitted through the control signal lines to the pumps thereby setting a maximum limit on the output of the pumps and a maximum limit on the speed of the motors. This is accomplished by depressing the actuator 46 of the regulator 34. In so doing, the first and second ports 91 and 93, of the third actuator will be in communication and output pressure will be transmitted to the third ports of the first and second regulators at a level depending on the degree of actuation of the actuator 46. The increase in pressure will be transmitted through lines 48, 52 and 50 raising the pressure of the first and second regulators irrespective of their actuators 42 and 44. For example, the actuator 46 may be set at one position and maintained there and in so doing, a certain pressure over and above the pressure set by the spring will be maintained in chamber 56 in each of the regulators 30 and 32. It is to be understood that under normal spring biasing action, when the actuator of each regulator is at its full non-actuating position, the pressure at 84 is communicative with pressure at 88 through passage 78 of valve 74 since the output pressure at 84 is sufficient to overcome the spring force and to drive the valve to the right. But upon increase in pressure driving valve 74 to the left, the pressure in the control signal lines will raise proportionally. Once the third regulator-governor has been set at a certain level, any additional pressure supplied by a depression of the actuators of the two regulators will serve to increase the pressures over and above the minimum pressures set in by the governor.

In operation, a prime mover, not shown, drives pump 14 and pump 16 at a predetermined speed. At this predetermined speed, the output of each pump will be maximum when each of the actuators 42, 44 and 46 of the regulators 30, 32 and 34 are in the non-actuated position. Upon actuation of each of the actuators 42 and 44 either separately or simultaneously a portion of the pump output pressure will be transmitted back to the pump by an output regulating control signal. As mentioned earlier, the pump output is inversely proportional to the pressure of the control signal. In the non-actuated position of the actuators 42, 44 and 46, the control signal pressure is zero and pump output is maximum for a given speed of the primer mover driving the pumps and, therefore, vehicle speed is maximum. The maximum speed of the vehicle can be lowered or governed, however, by actuating the actuator 46 of regulator-governor 34. By so doing, a portion of the pump output pressure is transmitted to each of the regulators 30 and 32 to increase the pressure acting on the valve 74 irrespective of the actuation of the actuators 42 and 44. This in turn increases the control signal pressure from zero upward to a level corresponding to the degree of adjustment of the regulator 34. Consequently, because of the above-mentioned inverse relationship, the maximum level of pump output and consequently the maximum motor speed will be lowered. The actuators 42 and 44 still are used, but any biasing force applied by those actuators will be in addition to that set in by the regulator 34.

The system as shown particularly adapted for the operation of track vehicles where it is desirable to slow down one track relative to the other to effect a turning movement. However, it is to be understood that this system can be used for any wheeled vehicle whether the movement of the wheels is controlled independently or in unison. For example, the first and second regulators could be connected to one actuation source such that both wheels of the vehicle are controlled simultaneously by one actuator movement.

In a general manner, while there has been disclosed an effective and efficient embodiment of the invention, it should be well understood that the invention is not limited to such an embodiment as there might be changes made in the arrangement, dispoition, and form of the parts without departing from the principle of the present invention as comprehended within the scope of the accompanying claims.

We claim:

1. In a vehicle having right and left ground-engaging means, a drive system comprising first and second hydraulic motors for driving said right and left ground-engaging means respectively, a pump for driving each of said hydraulic motors of the type having a variable output inversely proportional to the pressure of a hydraulic control signal, the improvement comprising, first and second pressure regulator means regulating the pressure of the control signal to said first and second pumps respectively over a range of pressures, actuators for said first and second pressure regulators, a third regulator communicating with each of said first and second regulators, said first and second regulators being in communication with the output pressure of said pumps and variably communicating said output pressures back to said first and second pumps over said range of pressures as said control signals, said third regulator being in communication with the output pressure of said pumps and variably communicating a portion of said output pressure to said first and second regulators for assisting in the control of said first and second regulators and for setting a lower limit of said pressure range of said control signal irrespective of said actuators.

2. In a vehicle, a drive system comprising a hydraulic drive motor, a pump for driving said motor of the type having a variable output which is inversely proportional to the pressure of a hydraulic control signal, the improvement comprising, first pressure regulator means regulating the pressure of the control signal to said pump over a range of pressures, actuator means for controlling said pressure regulator means and thereby controlling the pressure of said control signal, second pressure regulator means communicating with said first regulator means, each of said regulators being in communication with the output pressure of said pump, said first regulator variably communicating said output pressure back to said pump as said control signal over said range of pressures, said second regulator means variably communicating said output pressure to said first regulator means to assist in the control thereof and selectively setting a lower limit of said pressure range regulated by said first regulator means irrespective of said actuator means.

3. In a vehicle having right and left ground-engaging means, a drive system comprising first and second hydraulic motors for driving said right and left ground-engaging means respectively, a pump for driving each of said hydraulic motors of the type having a variable output inversely proportional to the pressure of a hydraulic control signal, the improvement comprising, first and second pressure regulator means regulating the pressure of the control signal to said first and second pumps respectively over a range of pressures, actuators for said first and second pressure regulators, a third regulator communicating with each of said first and second regulators, means communicating the output pressures of said pumps to each of said regulators, siad first and second regulators variably communicating the output pressure back to said first and second pumps as control signals, valve means in each of said regulators responsive to said output pressures, adjustable biasing means operated by said actuators acting on said valve means whereby the greater the biasing force the greater the pressure transmitted from the regulators as control signals, said third regulator variably communicating said output pressure to said first and second regulators whereby the force of the biasing means of the first and second regulators is augmented by the pressure transmitted from said third regulator thereby providing a minimum biasing force irrespective of said adjustable biasing means and setting a lower limit on the pressures transmitted as control signals.

4. A vehicle drive system as defined in claim 3 wherein each of said regulators are substantially identical and each have first, second and third ports, said first port is in communication with said output lines of said pumps, and in said first and second regulators, said second port is in communication with the pressure responsive control means of each of said pumps said third port is in communication with the second port of said third regulator, said third port of said third regulator communicating with tank, and each of said valves have first and second positions, first passageway means communicating said first port with said second port when said valve is in said first position, second passageway means communicating said second port with said third port, when said valve means is in said second position, said valves urged to said first position by said biasing means and movable to said second position in response to pressure from said output lines in excess of the force exerted by said biasing means, said valve normally assuming said second position absent actuation of the actuator and augmentation of the biasing force by the third regulator.

* * * * *